United States Patent [19]

Koerner et al.

[11] Patent Number: 4,816,541

[45] Date of Patent: Mar. 28, 1989

[54] METHOD FOR THE PREPARATION OF SIH-CONTAINING ORGANOPOLYSILOXANES

[75] Inventors: Götz Koerner; Christian Weitemeyer, both of Essen; Dietmar Wewers, Bottrop, all of Fed. Rep. of Germany

[73] Assignee: Th. Goldschmidt AG, Essen, Fed. Rep. of Germany

[21] Appl. No.: 106,124

[22] Filed: Oct. 7, 1987

[30] Foreign Application Priority Data

Nov. 3, 1986 [DE] Fed. Rep. of Germany ....... 3637273

[51] Int. Cl.$^4$ ............................................. C08G 77/00
[52] U.S. Cl. .................................. 528/10; 204/157.62; 204/157.74; 522/148; 524/366; 528/25; 528/31; 556/451; 556/462; 556/474
[58] Field of Search ....................... 204/157.62, 157.74; 556/474, 451, 462; 528/10, 25, 31; 522/148; 324/366

[56] References Cited

U.S. PATENT DOCUMENTS 3,496,206 2/1970 Berger .................................. 556/474
4,542,005 9/1985 Tetsuya et al. ..................... 556/474

*Primary Examiner*—Melvyn I. Marquis
*Attorney, Agent, or Firm*—Toren, McGeady & Associates

[57] ABSTRACT

A method is disclosed for the synthesis of SiH-containing organopolysiloxanes from the corresponding Si-halogen-containing organopolysiloxanes by the reaction with metal hydrides in a liquid reaction medium. The method has the following combiniation of characteristics:

(a) the use of a metal hydride being LiH, NaH, KH, CaH$_2$ or MgH$_2$;
(b) the use of ethers as reaction medium;
(c) the continuous removal of the metal halide depositing on the surface of the metal hydride particles during the reaction by the action of mechanical energy or ultrasound with formation of a fresh surface.

The reaction proceeds practically quantitatively and at low temperatures. It can be applied with particular advantage to industrially obtained mixtures of $\alpha,\omega$-dichloroorganopolysiloxanes.

15 Claims, No Drawings

METHOD FOR THE PREPARATION OF SIH-CONTAINING ORGANOPOLYSILOXANES

FIELD OF INVENTION

The invention is directed to a method for the preparation of SiH-containing organopolysiloxanes from the corresponding Si-halogen-containing organopolysiloxanes by reaction with metal hydrides in a liquid reaction medium.

BACKGROUND INFORMATION AND PRIOR ART

In U.S. Pat. No. 3,099,672, a method is described for reacting halogen- or alkoxysilanes with sodium hydride at a temperature of 175° to 350° C. By employing this method, which is applicable only for silanes and not for organopolysiloxanes, the halogen or alkoxy group is replaced by a hydrogen atom. The yields obtained are variable.

In accordance with U.S. Pat. No. 3,099,672, the sodium hydride is used as such, as a suspension in mineral oil or other high-boiling, inert hydrocarbons or in the form of a coating on sodium chloride particles. The need to use relatively high temperatures makes the method more expensive and frequently leads to unwanted by-products.

In U.S. Pat. No. 3,535,092, a method is described for the reaction of compounds, which have Si-halogen groups, with sodium hydride. This reaction proceeds already at room temperature or at temperatures raised only moderately. This is accomplished by the use of special solvents, such as hexaalkyl phosphoramides, octaalkyl pyrophosphoramides and tetraalkylurea. The alkyl groups in the solvent contain 1 to 4 carbon atoms. It may, moreover, be inferred from U.S. Pat. No. 3,535,092 that these solvents are said to have a catalytic effect. The method is applicable for halogensilanes as well as for halogensiloxanes. Alkoxysilanes do not react under the same conditions. Since the solvents have high boiling points, the products of the method, which contain SiH groups, are distilled from the reaction mixture. Consequently, the applicability of this method is restricted to those SiH-containing silanes or siloxanes, which can be distilled off at a technically justifiable expenditure and without thermal decomposition. Removal of the aforementioned solvents by washing them out is not readily possible. On separating the solvent with water, the excess sodium hydride forms sodium hydroxide, which leads in the aqueous medium to the formation of SiOSi bonds, hydrogen being split off. However, since the solvents named in this patent are physiologically objectionable, a complete separation of the Si-containing products of the method from the solvents is a necessary prerequisite for most applications.

Instead of sodium hydride, it has been suggested to use complex hydrides, such as sodium aluminum hydride, to exchange Si-halogen groups for SiH groups. For example, a method is described in the German Auslegeschrift No. 1,085,875 for preparing polysiloxane hydrides of the general formula

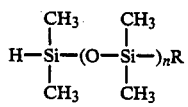

wherein n is a whole number, especially one form 1 to 5, and R represents hydrogen, alkyl or aryl. Pursuant to this method, polysiloxanes of the general formula

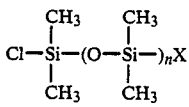

in which X represents chlorine, alkyl or aryl and n has the above meaning, are reacted with lithium aluminum hydride. In accordance with the examples of the German Auslegeschrift No. 1,085,875, 1,7-dichlorooctamethyltetrasiloxane is converted with lithium aluminum hydride in tetrahydrofuran in 74% yield into 1,7-dihydrooctamethyltetrasiloxane. The conversion of 1-chloropentamethyldisiloxane into 1-hydrogenpentamethyldisiloxane with lithium aluminum hydride is said to proceed in a 57% yield.

As is evident from the "Polish Journal of Chemistry" 53 (1979) 1383 to 1386, a reproduction of the method of the German Auslegeschrift No. 1,085,875 has shown that SiOSi bonds are split in competition with the exchange of Si-halogen groups, so that silanes, such as the gaseous and easily ignitable dimethylsilane, are formed to a considerable extent as by-product. This is in agreement with the information in "Chemie und Technologie der Silicone" (Chemistry and Technology of the Silicones) by W. Noll, Verlag Chemie, 1968, page 206. It is stated there that siloxane bonds are converted into alumosiloxane bonds by the action of lithium aluminum hydride in ether on linear polydimethylsiloxanes, silanes being split off. This splitting reaction is practically quantitative with silicate esters. The splitting of SiOSi bonds by the action of lithium aluminum hydride may also be inferred from the Zeitschrift für Naturforschung, 10 b, (1955) 423 to 424.

A similar method, in which trisodium aluminum hexahydride is used as complex aluminum hydride, is described in the German Auslegeschrift No. 1,568,255. The splitting of SiOSi bonds is a competing reaction, even when this complex hydride is used.

OBJECTS OF THE INVENTION

It is an object of the invention to overcome the disadvantages of the prior art methods and to provide a method, which permits the replacement of Si-halogen groups, especially of SiCl groups, by SiH groups at low temperatures, using physiologically safe reaction media and without appreciably splitting of SiOSi bonds. The method shall be applicable to organopolysiloxanes with Si-halogen groups of any molecular weight and especially of higher molecular weight. The method shall preferably be implementable with α,ω-halogenorganopolysiloxanes, α,ω-halogen-organopolysiloxanes, which are not distillable because of their higher molecular weight, being of special interest. The α,ω-chloroorganopolysiloxane mixtures, like those obtained in the known industrial processes in a form in which they cannot be distilled, are of special importance.

SUMMARY OF THE INVENTION

Pursuant to the invention, the replacement of Si-halogen groups by SiH groups succeeds surprisingly by reacting Si-halogen-containing organopolysiloxanes with metal hydrides in a liquid reaction medium in a method with the following combination of characteristics:

(a) the use of a metal hydride from the group comprising LiH, NaH, KH, CaH$_2$, MgH$_2$;
(b) the use of ethers as reaction medium;
(c) the continuous removal of the metal halide depositing on the surface of the metal hydride particles during the reaction with formation of a fresh surface by the action of mechanical energy or ultrasound.

A preferred embodiment of the inventive method is one in which α,ω-chloroorganopolysiloxanes are reacted with LiH in tetrahydrofuran as reaction medium with continuous removal of the lithium chloride depositing on the surface of the metal hydride particles during the reaction with formation of fresh surface by the action of mechanical energy or ultrasound.

Especially preferred as α,ω-chloroorganopolysiloxanes are the α,ω-dichloropolydimethylsiloxanes.

In accordance with characteristic (a), the customary alkali or alkaline earth hydrides may be used. The metal hydrides may be added to the reaction medium in finely divided form. Preferably alkali hydride and especially lithium hydride are used.

As reaction medium corresponding to characteristic (b), ethers are used like those known from the state of the art for such methods. Especially preferred are ethers of the general formula

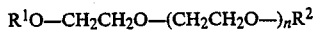

$R^1O$—$CH_2CH_2O$—$(CH_2CH_2O$—$)_nR^2$ wherein n is 0 or a whole number, preferably a number from 1 to 10. Especially preferred are compounds, in which n=0. $R^1$ and $R^2$ are the same or different and represent alkyl groups with 1 to 4 carbon atoms. Examples of such ethers, which come under the above-named formula, are 1,2-dimethoxyethane, diethylene glycol dimethyl ether, 1,2-diethoxy ethane, diethylene glycol diethyl ether, triethylene glycol dimethyl ether and tetraethylene glycol dimethyl ether.

Cyclic ethers such as tetrahydrofuran or dioxane or the polymeric compounds of tetrahydrofuran may also be used as ether, tetrahydrofuran being preferred.

Characteristic (c) of the inventive method is of exceptional importance. In the reaction of the metal hydrides listed under (a) in a stirred reaction medium named under (b) with an Si-halide-containing organopolysiloxane, there is no appreciable or adequate conversion within an economically justifiable time even at elevated temperatures. If, however, the reaction is carried out with stirring in the presence of, for example, grinding bodies, the conversion is quantitiative even at moderate temperatures. This could not have been forseen by those skilled in the art.

Such grinding bodies, which mostly are spherical, may comprise glass, ceramic or steel. It is also possible to use a fine grained grinding body such as sand. A further example of the effect of mechanical energy on the reaction mixture is the use of stirrers, which generate high shear forces in the reaction mixture. Suitable stirrers are, for example, ones which have one or several high-speed rotors within a stator. Furthermore, high-speed stirrers with so-called Mizer disks are suitable. Ball mills are particularly suitable fo the action of mechanical energy on the reaction mixture. It is furthermore possible to remove the deposited metal halides from the surface of the metal hydride particles by the action of ultrasound. For this purpose, ultrasonic generators, known from the state of the art, may be used.

The inventive method provides quantitative yields already at room temperature. The rate of the reaction can be acclerated even further by increasing the temprature of the reaction medium. However, for economic reasons and so as to avoid the possible formation of by-products, it is advisable not to exceed reaction temperatures of about 160° C. In most cases, the upper limit of the reaction temperature is determined by the boiling point of the reaction medium.

The metal hydrides are used in at least a stochiometric amount, based on the Si-halogen groups of the organopolysiloxane. It is, however, advisable to use an excess of about 10%, based on the stochiometeric amount. A higher excess admittedly accelerates the reaction; however, it also creates difficulties with respect to the removal of the residue.

After the reaction, which is completed within a period of a few hours, the reaction mixture is worked up in a per se known manner. For example, the metal halide that is formed, any excess metal hydride and any grinding bodies contained in the reaction medium are generally removed by filtration, while the solvent used is separated from the filtrate by distillation.

The method of the invention proceeds largely quantitatively and thus fulfills the conditions set at the beginning. The method is largely independent of the structure of the halogen-organopolysiloxanes. It enables especially the exchange of the α,ω halogen atoms and of the halogen atoms linked to Si and is equally applicable to low and high molecular weight halogenorganopolysiloxanes. Preferably, equilibrated halogenorganopolysiloxanes are used, for the equilibration of which Lewis acids, preferably FeCl$_3$, have been used as catalysts. Less suitable are the halogenorganopolysiloxanes that have been equilibrated with sulfuric acid, since silyl sulfate groups, contained in the siloxane, can be reduced during the reaction with alkali or alkaline earth hydrides to silylmercapto groups, which have an unpleasant odor.

The invention is described in still greater detail by means of the following examples, which are given by way of illustration and not by way of limitation.

EXAMPLE 1

To an apparatus, consisting of a 500 ml 4-neck, tapered joint flask, which is equipped with a dropping funnel, internal thermometer, stirrer and reflux condenser and is connected to a cooling trap (−78° C.), 8.7 g (1.1 moles) of LiH, 100 g of tetrahydrofuran and 200 g of ceramic spheres with a diameter of 2 mm area added under nitrogen. α,ω-Dichloropolydimethylsiloxane (280.1 g, 0.5 moles) is added dropwise and swiftly to the LiH suspension with stirring. The decrease in the chlorine that is bound to silicon is followed acidimetrically. After heating for 8 hours under reflux (67° C.), chlorine bound to silicon is no longer detectable. During the reaction, no volatile compounds are collected in the cooling trap. The reaction mixture obtained (586.1 g) filtered to remove the ceramic spheres, the LiCl that has formed and the unreacted LiH. The remaining filter residue is washed three times with 20 g of tetrahydrofuran, a total of 337.1 g of filtrate that is as clear as water being obtained. After removal of 125.3 g of tetrahydrofuran by distillation at 40° C./6 mbar and a subsequent filtration, 209.8 g of α,ω-dihydrogenpolydimethylsiloxane, corresponding to 85% of the theoretical yield, are obtained.

The hydrogen determination reveals 0.39% hydrogen. The $^1$H-NMR data, using CDCl$_3$, is as follows:

= 0.05 ppm (singlet, 30.7 H) —OSi(CH₃)₂—,
= 0.2 ppm (doublet, 12 H) H—Si(CH₃)₂—,
= 4.7 ppm (septet), 2 H H—Si(CH₃)₂—, The gas chromatographically determined distribution of the α,ω-dihydrogenpolydimethylsiloxane largely corresponds to that of the α,ω-dichloropolydimethylsiloxane used.

EXAMPLE 2

The apparatus comprises a 500 mL three-neck flask, which is equipped with a dropping funnel, internal thermometer and reflux condenser. The flask is placed within the ultrasonic bath. To this apparatus are added 6.6 g of LiH and 150 g of diethyl ether under nitrogen. 1,5-dibromo-1,1,3,3,5,5-hexamethyltrisiloxane (150.8 g) is slowly added dropwise while the ultrasonic bath is switched on. After heating for 6 hours under reflux, starting material can no longer be detected by gas chromatography. The reaction mixture obtained is filtered and, after removal of the diethyl ether, is distilled through a column with about 8 theoretical plates. At 128° C. under normal pressure, 69.1 g (80.4%) of 1,1,3,3,5,5-hexamethyltrisiloxane are distilled over.

EXAMPLE 3

The vessel consists of a 1-L three-neck flask, which is equipped with a dropping funnel, reflux condenser and a stirring system with rotor and stator steps. To this vessel are added 45.6 g (1.9 moles) of NaH and 150 g of diethylene glycol dimethyl ether under nitrogen. With the stirring system running 280.1 g (0.5 moles) of α,107-dichloropolydimethylsiloxane are added swiftly. The action of the stirring system leads to an exothermal reaction of the mixture. After boiling for 10 hours under reflux, a 98% conversion to α,ω-dihydrogenopolydimethylsiloxane is observed.

COMPARISON EXAMPLE 1

(not of the invention)

The experiment, described in Example 1, is repeated without using tetrahydrofuran. After 8 hours at 67° C., a 1% conversion and, after 48 hours, a 1.8% conversion can be detected acidimetrically.

COMPARISON EXAMPLE 2

(not of the invention)

The experiment described in Example 1 was repeated without using grinding bodies. After boiling for 48 hours under reflux, a 24% conversion can be detected acidimetrically.

It can be seen from Comparison Examples 1 and 2 that, in the absence of the inventive combination of characteristics, the synthesis of SiH-containing organopolysiloxanes from the corresponding Si-halogen-containing organopolysiloxanes by reaction with metal hydrides is not possible.

We claim:

1. A method for the synthesis of a SiH-containing organopolysiloxane, which comprises
   (a) reacting an Si-halogen-containing organopolysiloxane with a metal hydride selected from the group consisting of LiH, NaH, KH, CaH₂ and MgH₂ in a liquid ether reaction medium;
   (b) removing continuously metal halide deposited during the reaction on the surface of the metal hydride by the action of mechanical energy to form a deposit-free surface, and
   (c) recovering the SiH-containing organopolysiloxane reaction product.

2. The method as claimed in claim 1, wherein the Si-halogen-containing organopolysiloxane is a α-ω-halogen organopolysiloxane, whereby α-ω-hydrogen organopolysiloxane is recovered as the reaction product.

3. The method as claimed in claim 1, wherein the Si-halogen-containing organopolysiloxane is α-ω-chlorodimethylpolysiloxane, whereby α-ω-hydrogen-dimethylpolysiloxane is recovered as the reaction product.

4. The method as claimed in claim 1, wherein the removal of the metal halide deposits of step (b) is effected with ultrasound.

5. The method as claimed in claim 1, wherein the Si-halogen-containing organopolysiloxane of step (a) is α, ω-chloroorganopolysiloxane, the metal hydride is LiH and the ether reaction medium is tetrahydrofuran.

6. The method as claimed in claim 1, wherein the Si-halogen-containing organopolysiloxane of step (a) is a α-ω-dichloropolydimethylsiloxane, the metal halide is LiH and the ether reaction medium is tetrahydrofuran.

7. The method as claimed in claim 1, wherein the Si-halogen-containing organopolysiloxane of step (a) is a halogenorganopolysiloxane which has been equilibrated in the presence of a Lewis acid.

8. The method as claimed in claim 7, wherein the Lewis acid is FeCl₃.

9. The method of claim 1, wherein the ether of the liquid ether reaction medium has the general formula $$R^1O-CH_2CH_2O-(CH_2CH_2O)_nR^2$$

wherein n is 0 or a whole number from 1 to 10 and R¹ and R² are the same or different and represent alkyl with 1 to 4 carbon atoms.

10. The method of claim 1, wherein the ether of the liquid ether reaction medium is cyclic.

11. The method of claim 10, wherein the cyclic ether is tetrahydrofuran or dioxane.

12. The method of claim 1, wherein the action of mechanical energy is generated by grinding bodies.

13. The method of claim 1, wherein the method is carried out at a temperature between room temperature and about 160° C.

14. The method of claim 1, wherein said metal hydride is present in at least stoichiometric amounts, based on the Si-halogen groups of the Si-halogen-containing organopolysiloxane.

15. The method of claim 14, wherein about 10% of excess metal hydride, based on the stoichiometric amount, is employed.

* * * * *